(12) United States Patent
Flores Tapia (10) Patent No.: US 12,111,383 B2
(45) Date of Patent: Oct. 8, 2024

(54) RADAR SIGNALING FOR EMERGENCY SCENARIOS

(71) Applicant: GM CRUISE HOLDINGS LLC, San Francisco, CA (US)

(72) Inventor: Daniel Flores Tapia, Fairfield, CA (US)

(73) Assignee: GM CRUISE HOLDINGS LLC

( * ) Notice: Subject to any disclaimer, the term of this patent is extended or adjusted under 35 U.S.C. 154(b) by 378 days.

(21) Appl. No.: 17/560,428

(22) Filed: Dec. 23, 2021

(65) Prior Publication Data

US 2023/0204747 A1 Jun. 29, 2023

(51) Int. Cl.
*G01S 13/34* (2006.01)
*G01S 13/931* (2020.01)

(52) U.S. Cl.
CPC ............ *G01S 13/34* (2013.01); *G01S 13/931* (2013.01); *G01S 2013/9316* (2020.01)

(58) Field of Classification Search
CPC ........ G01S 7/406; G01S 13/75; G01S 13/751; G01S 13/34; G01S 13/931; G01S 2013/9316
See application file for complete search history.

(56) References Cited

U.S. PATENT DOCUMENTS

| | | | |
|---|---|---|---|
| 3,801,979 A * | 4/1974 | Chisholm | G01S 11/08 342/399 |
| 3,864,662 A * | 2/1975 | David | G01S 15/874 342/33 |
| 3,984,835 A * | 10/1976 | Kaplan | G01S 13/84 342/44 |
| 4,068,232 A * | 1/1978 | Meyers | G01S 13/758 342/51 |
| 5,053,774 A * | 10/1991 | Schuermann | B60C 23/0413 342/51 |
| 5,245,346 A * | 9/1993 | Nishimura | G01S 13/825 342/51 |
| 5,361,071 A * | 11/1994 | van Zon | G01S 13/751 342/51 |
| 5,387,916 A * | 2/1995 | Cohn | G06K 19/07749 342/51 |

(Continued)

FOREIGN PATENT DOCUMENTS

| | | |
|---|---|---|
| DE | 10 2019 008530 A1 | 8/2020 |
| EP | 4202490 | 6/2023 |

OTHER PUBLICATIONS

Extended European Search Report issued from the European Patent Office for EP application No. 22207796.8-1206, mailing date May 2, 2023, 8 pages.

*Primary Examiner* — Peter M Bythrow (57) ABSTRACT

Architectures and techniques for radar signaling in emergency scenarios. A high-frequency radio signal in a first frequency range from a remote device with a local radio frequency (RF) receiver. The received radio signal in the first frequency range is converted to a corresponding signal in a second and lower frequency range. Signal phase information in the lower frequency signal is modified to generate a modified signal in the lower frequency range. The modified signal in the lower frequency range is converted to the first frequency range. The modified signal in the first frequency range is transmitted to the remote device with an RF transmitter.

19 Claims, 5 Drawing Sheets

(56) References Cited

U.S. PATENT DOCUMENTS

| | | | | |
|---|---|---|---|---|
| 5,451,959 A * | 9/1995 | Schuermann | G01S 13/78 | 342/51 |
| 5,712,628 A * | 1/1998 | Phillips | H04B 1/0039 | 342/51 |
| 5,745,049 A * | 4/1998 | Akiyama | G05B 19/4183 | 342/51 |
| 5,825,302 A * | 10/1998 | Stafford | G06K 7/0008 | 340/10.5 |
| 5,847,661 A * | 12/1998 | Ricci | G08G 1/096716 | 340/447 |
| 5,945,938 A * | 8/1999 | Chia | H01Q 21/065 | 342/51 |
| 6,246,356 B1 | 6/2001 | Gunnarsson | G01S 7/024 | 342/51 |
| 6,657,580 B1 * | 12/2003 | Edwards | H01Q 3/2647 | 342/51 |
| 7,109,844 B2 * | 9/2006 | Taki | G06K 19/0723 | 340/10.2 |
| 7,667,573 B2 * | 2/2010 | Ehrman | G07C 5/008 | 700/214 |
| 8,274,373 B2 * | 9/2012 | Nysen | H03H 9/642 | 340/10.41 |
| 8,466,776 B2 * | 6/2013 | Fink | G06K 19/0675 | 343/754 |
| 9,613,237 B2 * | 4/2017 | Nikunen | G06K 7/10158 | |
| 9,720,080 B1 * | 8/2017 | Rodenbeck | G01S 7/006 | |
| 9,931,976 B1 * | 4/2018 | Terwilliger | G08G 1/163 | |
| 10,006,992 B2 * | 6/2018 | Hüttner | G01S 5/0284 | |
| 10,422,870 B2 * | 9/2019 | Mindell | G01B 11/14 | |
| 10,536,529 B2 * | 1/2020 | Davis | G01S 13/0209 | |
| 11,340,346 B1 * | 5/2022 | Stochino | G01S 7/484 | |
| 11,754,669 B2 * | 9/2023 | Gulati | G01S 13/325 | 342/201 |
| 2004/0032363 A1 * | 2/2004 | Schantz | G01S 11/06 | 342/146 |
| 2006/0232463 A1 * | 10/2006 | Burton | G01S 13/767 | 342/194 |
| 2015/0346332 A1 * | 12/2015 | Taylor, Jr. | G01S 13/84 | 342/458 |
| 2018/0326285 A1 * | 11/2018 | Petersen | G01S 13/88 | |
| 2019/0020404 A1 * | 1/2019 | Russell | F41H 13/005 | |
| 2019/0250269 A1 * | 8/2019 | Miu | G05D 1/021 | |
| 2020/0258392 A1 * | 8/2020 | Weissman | G01S 13/876 | |
| 2020/0363538 A1 * | 11/2020 | Farrell | G01S 7/003 | |
| 2022/0120893 A1 * | 4/2022 | Lee | H04L 27/18 | |
| 2022/0240168 A1 * | 7/2022 | Somayazulu | H04W 48/16 | |
| 2022/0276336 A1 * | 9/2022 | Zhang | G01S 7/021 | |
| 2022/0349985 A1 * | 11/2022 | Zhang | G01S 13/343 | |
| 2023/0003827 A1 * | 1/2023 | Ko | G01S 5/0236 | |
| 2023/0125780 A1 * | 4/2023 | Banach | B60W 60/001 | 342/70 |
| 2023/0131659 A1 * | 4/2023 | Banach | G01S 17/931 | 701/1 |
| 2023/0194713 A1 * | 6/2023 | Flores Tapia | G01S 7/0234 | 356/5.09 |

* cited by examiner

RADAR SIGNALING FOR EMERGENCY SCENARIOS

BACKGROUND

Automobiles and other transportation platforms (e.g., trucks, boats, barges) generally include multiple lights that, among other things, allow other vehicles, or operators of the other vehicles, to more easily locate and identify vehicles in their operating environment. However, traditional lighting-based mechanisms suffer from limited range and other shortcomings.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The components and techniques described herein can be used, for example, with an automobile as a roadside incident safety mechanism. Conceptually, the mechanisms described herein function as a warning beacon in a similar manner that flashing hazard lights on a vehicle serve as a warning signal. In various examples, a vehicle can radiate an emergency signal that can notify other vehicles having automotive radar that the radiating vehicle is under distress and/or is stationary or moving at a lower-than-expected speed. As described in greater detail below, the described safety mechanisms can function in all weather and/or lighting conditions and can provide a greater range than light-based systems.

Vehicles (whether automated or human-operated) occasionally experience significant malfunctions and must park on the side of a road. The disabled vehicle could also be obstructing a roadway. This can be a dangerous situation for passengers (if any) in the disabled vehicle as well as for non-disabled vehicles traveling along the road. For example, at high speeds it may be difficult for a vehicle operator (automated or human) to detect a vehicle and/or a pedestrian on the side of the road. This can be exacerbated by bad weather and/or lighting conditions (e.g., dusk, fog, rain). As another example, a disabled vehicle may cause confusion for a vehicle operator (automated or human) because the presence of the disabled vehicle can be unexpected. This can lead to overcorrections or other reactions can cause accidents or other unsafe conditions.

In various examples described below, a radar waveform sensing, amplification and repeating architecture is provided that can provide the emission of an extreme early warning signal that can provide vehicles a much earlier (and possibly more informational) notification as compared to current light-based systems. In some examples, the architecture can provide range and/or speed information about a vehicle in a disabled or distressed condition.

Figure 1:
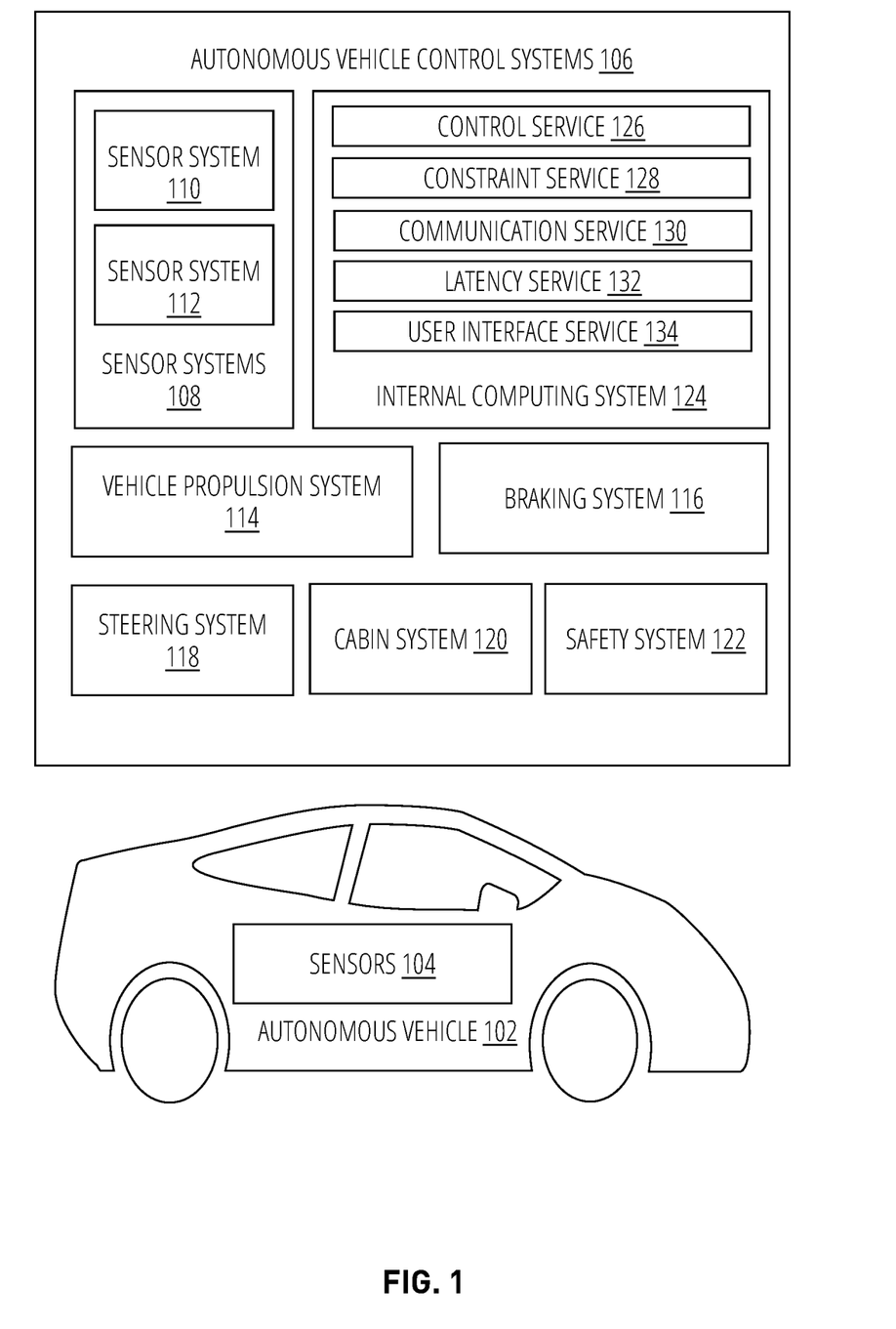
FIG. 1 is a block diagram of an example autonomous vehicle.

FIG. 1 is a block diagram of an example autonomous vehicle. Autonomous vehicle 102 has the functionality to navigate roads without a human driver by utilizing sensors 104 and autonomous vehicle control systems 106.

Autonomous vehicle 102 can include, for example, sensor systems 108 including any number of sensor systems (e.g., sensor system 110, sensor system 112). Sensor systems 108 can include various types of sensors that can be arranged throughout autonomous vehicle 102. For example, sensor system 110 can be a camera sensor system. As another example, sensor system 112 can be a light detection and ranging (LIDAR) sensor system. As a further example, one of sensor systems 108 can be a radio detection and ranging (RADAR) sensor system, an electromagnetic detection and ranging (EmDAR) sensor system, a sound navigation and ranging (SONAR) sensor system, a sound detection and ranging (SODAR) sensor system, a global navigation satellite system (GNSS) receiver system, a global positioning system (GPS) receiver system, accelerometers, gyroscopes, inertial measurement unit (IMU) systems, infrared sensor systems, laser rangefinder systems, microphones, etc.

Autonomous vehicle 102 can further include mechanical systems to control and manage operation of autonomous vehicle 102. For example, the mechanical systems can include vehicle propulsion system 114, braking system 116, steering system 118, cabin system 120 and safety system 122. Vehicle propulsion system 114 can include, for example, an electric motor, an internal combustion engine, or both. Braking system 116 can include an engine brake, brake pads, actuators and/or other components to control deceleration of autonomous vehicle 102. Steering system 118 can include components that control the direction of autonomous vehicle 102. Cabin system 120 can include, for example, cabin temperature control systems, in-cabin infotainment systems and other internal elements.

Safety system 122 can include various lights, signal indicators, airbags, systems that detect and react to other vehicles. In the examples that follow, safety system 122 can include a waveform sensing, amplification and repeating system that can provide early warning functionality. In the examples that follow, safety system 122 can function to modify received radar signals that have been transmitted by other vehicles.

Automobiles can utilize different types of radar systems, for example, long-range radar (LRR), mid-range radar (MRR) and/or short-range radar (SRR). LRR systems can be used, for example, to detect objects that are farther away (e.g., 200 meters, 300 meters) from the vehicle transmitting the signal. LRR systems typically operate in the 77 GHz band (e.g., 76-81 GHz). SRR systems can be used, for example, for blind spot detection or collision avoidance. SRR systems typically operate in the 24 GHz band. MRR systems can operate in either the 24 GHz band or the 77 GHz band. Other frequency bands can also be supported.

Autonomous vehicle 102 can further include internal computing system 124 that can interact with sensor systems 108 as well as the mechanical systems (e.g., vehicle propulsion system 114, braking system 116, steering system 118, cabin system 120, safety system 122). Internal computing system 124 includes at least one processor and at least one memory system that can store executable instructions to be executed by the processor. Internal computing system 124 can include any number of computing sub-systems that can function to control autonomous vehicle 102. Internal computing system 124 can receive inputs from passengers and/or human drivers within autonomous vehicle 102.

Internal computing system 124 can include control service 126, which functions to control operation of autonomous vehicle 102 via, for example, the mechanical systems as well as interacting with sensor systems 108. Control service 126 can interact with other systems (e.g., constraint service 128, communication service 130, latency service 132, user interface service 134) to control operation of autonomous vehicle 102.

Internal computing system 124 can also include constraint service 128, which functions to control operation of autonomous vehicle 102 through application of rule-based restrictions or other constraints on operation of autonomous vehicle 102. Constraint service 128 can interact with other systems (e.g., control service 126, communication service 130, latency service 132, user interface service 134) to control operation of autonomous vehicle 102.

Internal computing system 124 can further include communication service 130, which functions to control transmission of signals from, and receipt of signals by, autonomous vehicle 102. Communication service 130 can interact with safety system 122 to provide the waveform sensing, amplification and repeating functionality described herein. Communication service 130 can interact with other systems (e.g., control service 126, constraint service 128, latency service 132, user interface service 134) to control operation of autonomous vehicle 102.

Internal computing system 124 can also include latency service 132, which functions to provide and/or utilize timestamp information on communications to help manage and coordinate time-sensitive operations within internal computing system 124 and autonomous vehicle 102. Thus, latency service 132 can interact with other systems (e.g., control service 126, constraint service 128, communication service 130, user interface service 134) to control operation of autonomous vehicle 102.

Internal computing system 124 can further include user interface service 134, which functions to provide information to, and receive inputs from, human passengers within autonomous vehicle 102. This can include, for example, receiving a desired destination for one or more passengers and providing status and timing information with respect to arrival at the desired destination. User interface service 134 can interact with other systems (e.g., control service 126, constraint service 128, communication service 130, latency service 132) to control operation of autonomous vehicle 102.

Internal computing system 124 can function to send and receive signals from autonomous vehicle 102 regarding reporting data for training and evaluating machine learning algorithms, requesting assistance from a remote computing system or a human operator, software updates, rideshare information (e.g., pickup, dropoff), etc.

As discussed in greater detail below, if autonomous vehicle 102 becomes disabled (e.g., engine/motor malfunction, flat tire, collision) internal computing system 124, safety system 122 and/or other components of autonomous vehicle 102 can utilize an early warning signaling system that can modify radar signals received from other vehicles.

Figure 2:
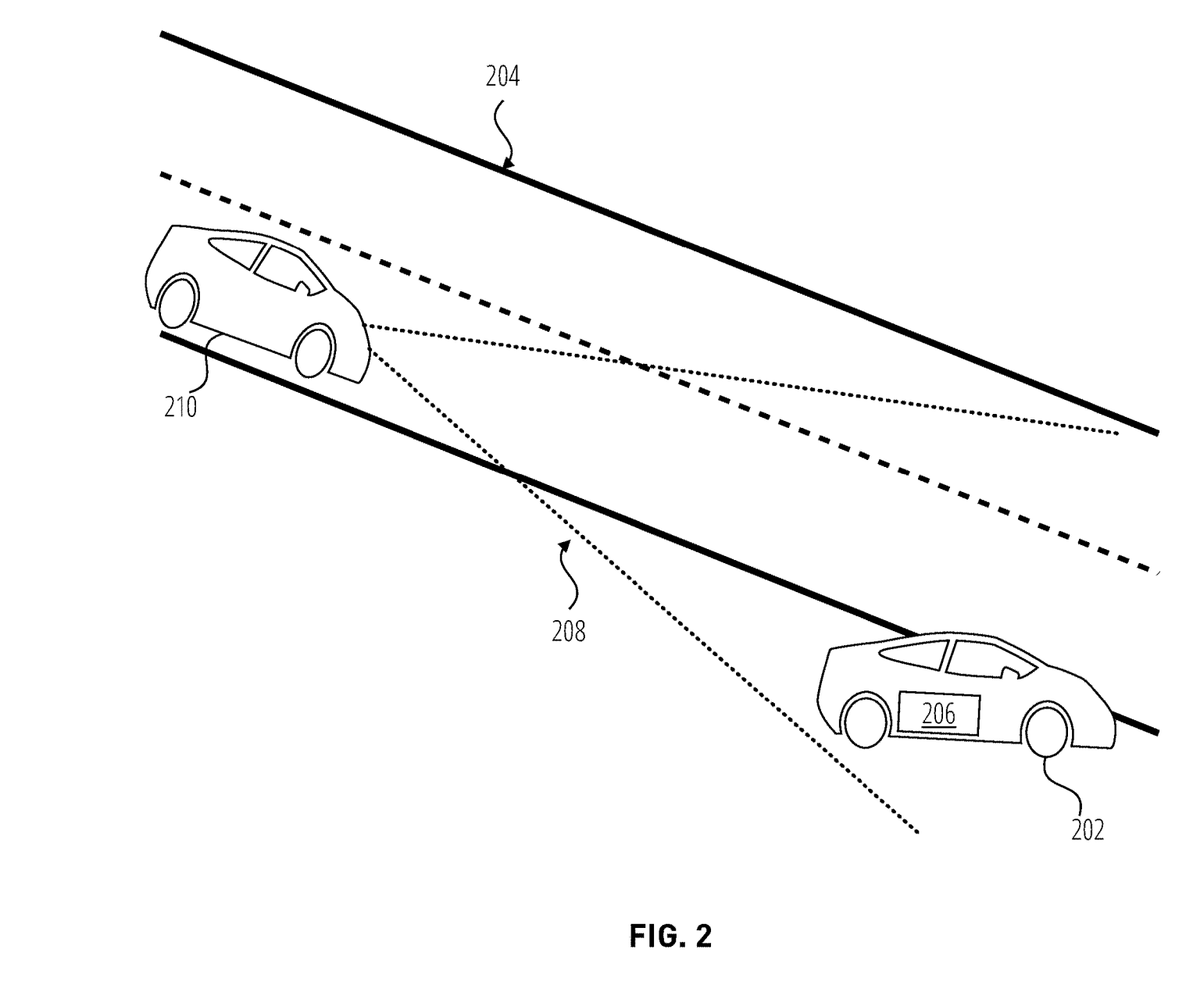
FIG. 2 illustrates an example situation in which a disabled vehicle may utilize a waveform sensing, amplification and repeating system that can provide early warning functionality.

FIG. 2 illustrates an example situation in which a disabled vehicle may utilize a waveform sensing, amplification and repeating system that can provide early warning functionality. In the example of FIG. 2, disabled vehicle 202 may be next to, or obstructing, road 204. Disabled vehicle 202 may include the systems and sensors described with respect to FIG. 1. Further, disabled vehicle 202 can provided the early warning functionality described with respect to FIG. 3, FIG. 4 and/or FIG. 5.

In response to becoming disabled, disabled vehicle 202 may engage the warning functionality described herein as provided by warning system 206 (which can be, for example, responsive to cabin system 120). This may be accomplished automatically by one or more sensors within disabled vehicle 202, or manually be a passenger in disabled vehicle 202.

After engaging the warning functionality, disabled vehicle 202 may receive radar signals 208 from remote vehicle 210. In response to receiving radar signals 208, disabled vehicle 202 can use warning system 206 to modify received radar signals (e.g., radar signals 208) and transmit the modified radar signals back to remote vehicle 210, which can result in remote vehicle 210 taking sufficient precautions to safely navigate conditions caused by disabled vehicle 202. Disabled vehicle 202 can contemporaneously respond to multiple remote vehicles (e.g., 210). Various example techniques and architectures for providing the modified radar signals are discussed below with respect to FIG. 3, FIG. 4 and FIG. 5.

Figure 3:
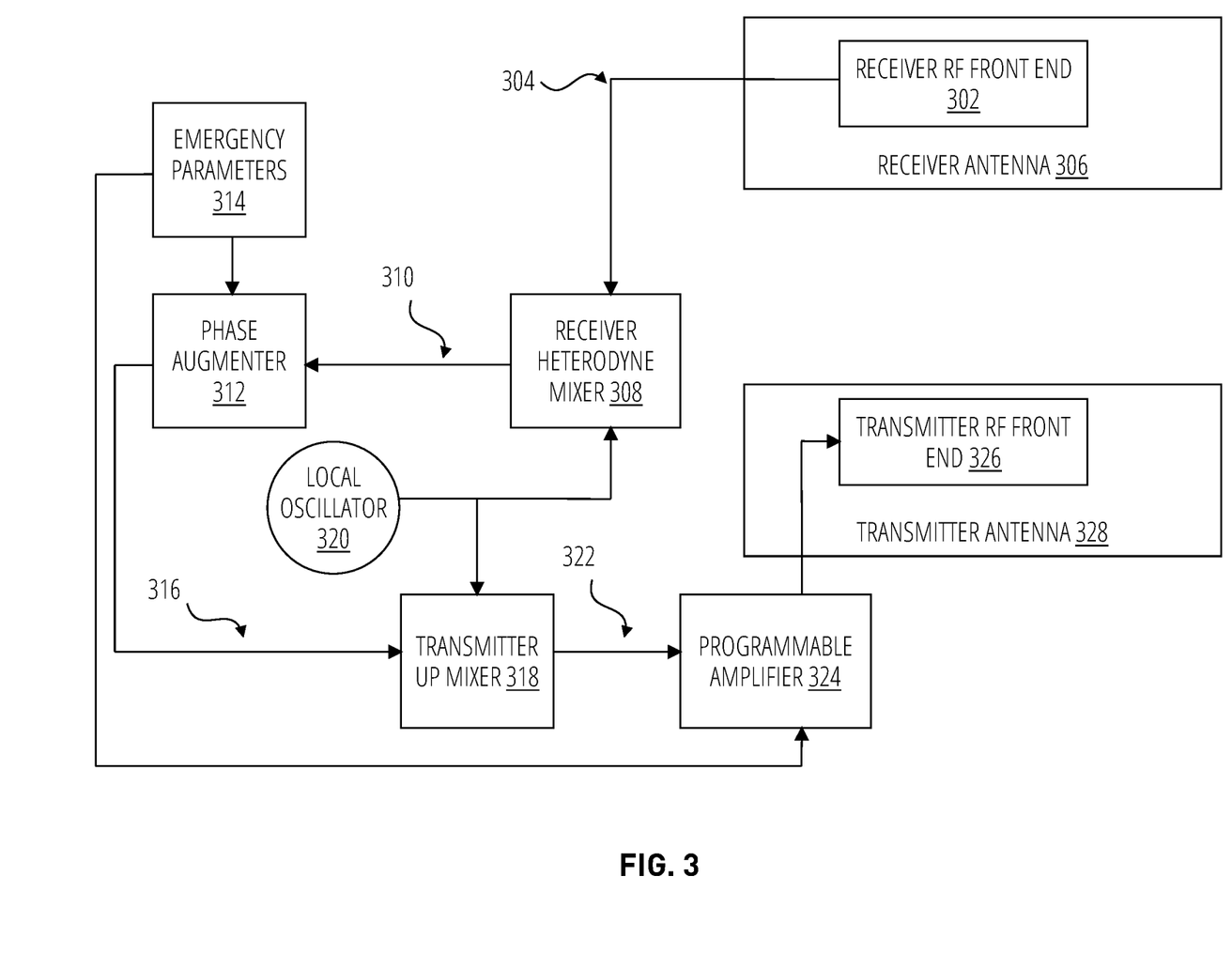
FIG. 3 is a block diagram of an example waveform sensing, amplification and repeating system that can provide early warning functionality.

FIG. 3 is a block diagram of an example waveform sensing, amplification and repeating system that can provide early warning functionality. In various examples, the system of FIG. 3 can augment radio frequency (RF) signals (e.g., radar signals) received from other vehicles (e.g., radar signals 208) to provide a distinguishable set of features to allow a remote automated driving system (e.g, 210), or an advanced driver assistance system (ADAS), enough information to avoid a collision. The example system of FIG. 3 can be part of, for example, an autonomous vehicle (AV) as illustrated in FIG. 1 and can be part of, for example, warning system 206.

Receiver RF front end 302 can function to receive high-frequency received radar signal 304 from remote sources (not illustrated in FIG. 3) via receiver antenna 306. High-frequency received radar signal 304 can be, for example, radar signals from an AV or radar signals from a vehicle having an ADAS. High-frequency received radar signal 304 received by receiver RF front end 302 are sent to receiver heterodyne mixer 308, which functions as a downmixer stage. Thus, receiver heterodyne mixer 308 converts high-frequency received radar signal 304 waveforms to lower-frequency baseband signal 310 for signal augmentation.

The example downmixer architecture of FIG. 3 allows the architecture of FIG. 3 to be waveform agnostic and process any type of radar waveform. In one example, lower-frequency baseband signal 310 can be between 20 MHz and 100 MHz. As another example, lower-frequency baseband signal 310 can be between 20 MHz to 4 GHz. The choice of frequencies for lower-frequency baseband signal 310 can depend on, for example, a radar waveform being used and/or other factors.

Phase augmenter 312 is coupled to receive lower-frequency baseband signal 310 from receiver heterodyne mixer 308. Phase augmenter 312 is also coupled to receive emergency parameters 314, which can provide inputs on augmentation operations to be performed by phase augmenter 312. In one example, phase augmenter 312 can add a user defined phase (e.g., Doppler) offset to lower-frequency baseband signal 310 received from receiver heterodyne mixer 308. The phase offset is one type of parameter that can be included in emergency parameters 314. The additional information added to lower-frequency baseband signal 310 by phase augmenter 312, for example, phase offset can modify the output signal from the architecture of FIG. 3 sufficiently that a remote receiving vehicle (not illustrated in FIG. 3) will not consider the host vehicle an inactive element.

Lower-frequency augmented signal 316 from phase augmenter 312 can be sent to transmitter up mixer 318 to convert lower-frequency augmented signal 316 from the lower frequency band to the original automotive radar band. In one example, both receiver heterodyne mixer 308 and transmitter up mixer 318 are coupled with, and utilize, local oscillator 320 to provide reference frequency information.

High-frequency augmented signal 322 from transmitter up mixer 318 is sent to programmable amplifier 324 for amplification. In one example, programmable amplifier 324 is coupled to receive emergency parameters 314, which can indicate an amount of amplification to be provided by programmable amplifier 324. In one example, the amplification is a user-defined amount indicated by emergency parameters 314.

High-frequency augmented signal 322 from programmable amplifier 324 is sent to transmitter RF front end 326 to be transmitted via transmitter antenna 328. Thus, the resulting transmitted waveform includes a distinguishable set of features to allow AVs and/or ADAS-equipped vehicles to acquire enough information to avoid a collision with the host vehicle and/or pedestrians associated with the host vehicle. The nature of the transmitted waveform allows the system to operate effectively in adverse weather conditions and low-light scenarios with minimal or no performance degradation.

Figure 4:
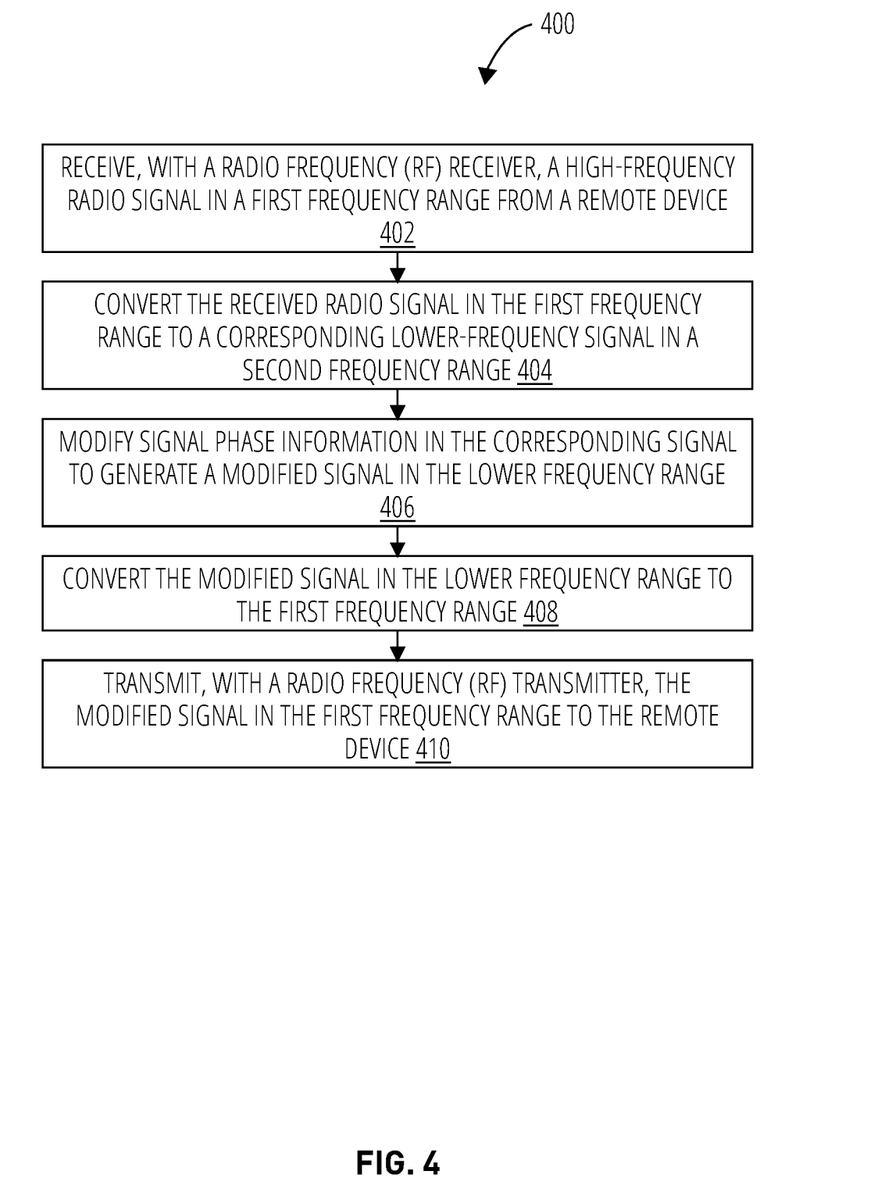
FIG. 4 is an example technique that can provide control of waveform sensing, amplification and repeating to provide early warning functionality.

FIG. 4 is an example technique that can provide control of waveform sensing, amplification and repeating to provide early warning functionality. In response to a vehicle operator (automated or human) activating a warning system, the following functionality 400 can be provided via, for example, the architectures of FIG. 1 and FIG. 3.

In block 402, a radio frequency (RF) receiver (e.g., receiver RF front end 302) receives a high-frequency radio signal in a first frequency range from a remote device. In one example, the first frequency range can correspond to an automotive radar range. In other examples different frequency ranges can be supported. In one example, the RF receiver can be part of a control system of an autonomous vehicle (AV). In other examples, the RF receiver can be part of a driver assistance system of a human-operated vehicle.

In block 404, the received high-frequency radio signal is converted from the first frequency range to a corresponding lower-frequency signal in a second frequency range by, for example, a heterodyne mixer (e.g., receiver heterodyne mixer 308). Various frequency ranges can be supported for the lower-frequency signal. In one example, the second frequency range can be 20 MHz to 100 MHz. As another example, the second frequency range can be 20 MHz to 4 GHz.

In block 406, phase information in the lower-frequency signal is modified (e.g., by phase augmenter 312) to generate a modified signal in the lower frequency range. In one example, a phase shift is added to the lower-frequency signal to simulate a low-velocity movement of the host vehicle. In other examples, different phase modifications can be utilized. The phase modification can prevent the response signal transmitted by the host vehicle from being filtered out by the receiving vehicle. For example, some ADAS radars filter out responses that correspond to stationary objects. Such filtering could cause the host vehicle to "disappear" from the remote vehicle radar.

In block 408, the phase-modified signal in the lower frequency range is converted back to the higher first frequency range. Thus, the phase-modified high-frequency signal can provide the appearance of low-velocity movement of the host vehicle. Because the phase-modified high-frequency signal mimics a slow-moving vehicle, the receiving vehicle can take appropriate evasive actions to avoid a collision with the host vehicle or with pedestrians associated with the host vehicle.

In block 410, the phase-modified high-frequency signal in the first frequency range is transmitted to the remote device. Because the signaling provided is in the automotive radar range, the functionality described can function effectively in many weather conditions as well as low-visibility conditions. Further, because the received signal and the transmitted signal are in the automotive radar range, the functionality is compatible with many (if not all) current automotive radar systems without the need for modification.

Figure 5:
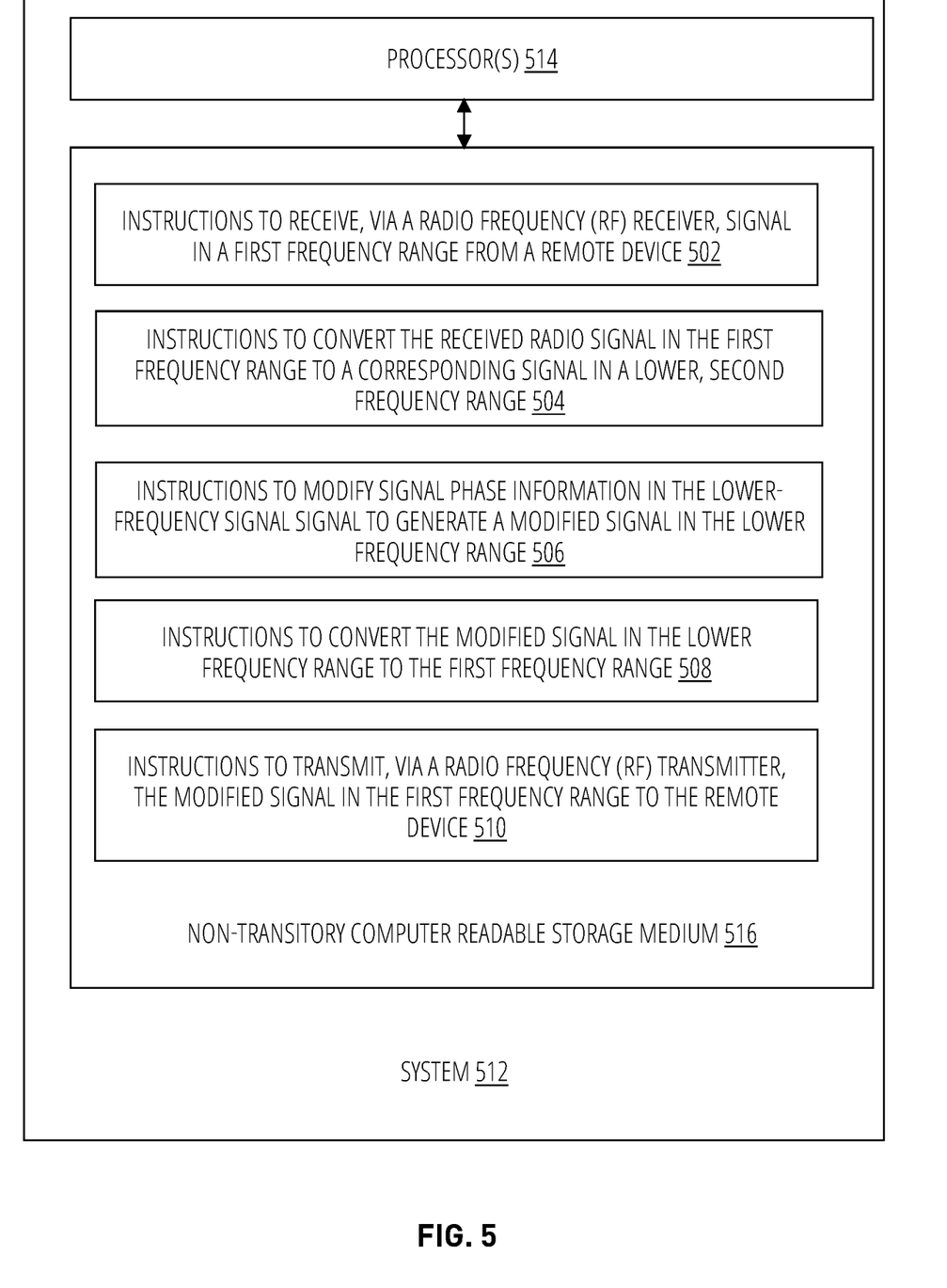
FIG. 5 is a block diagram of one example of a processing system that can provide control of waveform sensing, amplification and repeating to provide early warning functionality.

FIG. 5 is a block diagram of one example of a processing system that can provide control of waveform sensing, amplification and repeating to provide early warning functionality. In one example, system 512 can be part of an autonomous vehicle (e.g., autonomous vehicle 102 as part of internal computing system 124) that utilizes various sensors including radar sensors. In other examples, system 512 can be part of a human-operated vehicle having an advanced driver assistance system (ADAS) that can utilized various sensors including radar sensors.

In an example, system 512 can include processor(s) 514 and non-transitory computer readable storage medium 516. Non-transitory computer readable storage medium 516 may store instructions 502, 504, 506, 508 and 410 that, when executed by processor(s) 514, cause processor(s) 514 to perform various functions. Examples of processor(s) 514 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of a non-transitory computer readable storage medium 516 include tangible media such as random access memory (RAM), read-only memory (ROM), electrically erasable programmable read-only memory (EEPROM), flash memory, a hard disk drive, etc.

Instructions 502 cause processor(s) 514 to control a radio frequency (RF) receiver (e.g., receiver RF front end 302) to receive a high-frequency radio signal in a first frequency range (e.g., automotive radar range) from a remote device. The received high-frequency radio signal can be sent to a heterodyne mixer.

Instructions 504 cause processor(s) 514 to control the heterodyne mixer (e.g., receiver heterodyne mixer 308) to convert the received high-frequency radio signal the first frequency range to a corresponding lower-frequency signal in a second frequency range. Various frequency ranges can be supported for the lower-frequency signal. In one example, the second frequency range can be 20 MHz to 100 MHz. As another example, the second frequency range can be 20 MHz to 4 GHz.

Instructions 506 cause processor(s) 514 to control a phase augmenter (e.g., phase augmenter 312) to modify/augment phase information in the lower-frequency signal to generate a modified signal in the lower frequency range. In one example, a phase shift is added to the lower-frequency signal to simulate a low-velocity movement of the host vehicle. In other examples, different phase modifications can be utilized.

Instructions 508 cause processor(s) 514 to control an upmixer (e.g., transmitter up mixer 318) to convert the phase-modified signal in the lower frequency range to the higher, first frequency range. The resulting phase-modified high-frequency signal can provide the appearance of low-velocity movement of the host vehicle.

Instructions 510 cause processor(s) 514 to control a transmitter (e.g., transmitter RF front end 326) to transmit the phase-modified high-frequency signal to the remote vehicle from which the original signal as received.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 516 has stored thereon data representing sequences of instructions that, when executed by a processor(s) 514, cause the processor(s) 514 to perform certain operations.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A system comprising:
a radio frequency (RF) receiver to receive a radio signal from a remote source;
a signal augmentation agent coupled with the RF receiver to modify signal phase information in the received radio signal based on one or more emergency parameters to generate a modified signal in response to a detection of an emergency condition; and
a radio frequency (RF) transmitter coupled with the signal augmentation agent to transmit the modified signal, wherein the modified signal is indicative of the emergency condition.

2. The system of claim 1, further comprising:
a receiver heterodyne mixer coupled with the RF receiver and with the signal augmentation agent, the receiver heterodyne mixer to convert the received radio signal from the remote source from a high frequency radar range to a lower baseband range;
wherein the signal augmentation agent functions to modify signal phase information in the lower baseband range;
a transmitter up mixer coupled with the signal augmentation agent to convert the modified signal from the lower baseband range to the high frequency radar range; and
an amplifier coupled with the transmitter up mixer and to receive one or more pre-selected amplification parameters, the amplifier to amplify the modified signal based on the received one or more pre-selected amplification parameters.

3. The system of claim 1, wherein the modification to the signal phase information indicates movement of a host vehicle.

4. The system of claim 1, wherein the signal augmentation agent functions to add a user-defined phase offset to the received radio signal.

5. The system of claim 1, wherein the remote source comprises a remote autonomous vehicle.

6. The system of claim 1, wherein the received radio signal comprises a radar signal.

7. A non-transitory computer-readable medium having stored thereon instructions that, when executed by one or more processors, are configurable to cause the one or more processors to:
receive, with a radio frequency (RF) receiver, a high-frequency radio signal in a first frequency range from a remote device;
convert the received radio signal in the first frequency range to a corresponding signal in a second frequency range that is lower than the first frequency range;
modify signal phase information in the corresponding signal to generate a modified signal in the second frequency range, wherein the modification is enabled in response to detection of an emergency condition;
convert the modified signal in the second frequency range to the first frequency range to generate a high-frequency modified signal; and
transmit, with a radio frequency (RF) transmitter, the high-frequency modified signal in the first frequency range to the remote device, wherein the high-frequency modified signal is indicative of the emergency condition.

8. The non-transitory computer-readable medium of claim 7, wherein the remote device comprises a remote autonomous vehicle.

9. The non-transitory computer-readable medium of claim 8, wherein the received high-frequency radio signal comprises a radar signal.

10. The non-transitory computer-readable medium of claim 7, wherein the modification to the signal phase information is based on one or more pre-selected phase parameters.

11. The non-transitory computer-readable medium of claim 7, further comprising instructions that, when executed by the one or more processors, cause the one or more processors to amplify the modified signal in the first frequency range.

12. The non-transitory computer-readable medium of claim 11, further comprising instructions that, when executed by the one or more processors, cause the one or more processors to amplify the modified signal based on the received one or more pre-selected amplification parameters.

13. The non-transitory computer-readable medium of claim 7, wherein the modification is enabled in response to user input received from a physical interface within an autonomous vehicle.

14. A method comprising:
- receiving, with a radio frequency (RF) receiver, a high-frequency radio signal in a first frequency range from a remote device;
- converting the received radio signal in the first frequency range to a corresponding signal in a second frequency range that is lower than the first frequency range;
- modifying signal phase information in the corresponding signal to generate a modified signal in the second frequency range, wherein the modification is enabled in response to detection of an emergency condition;
- converting the modified signal in the second frequency range to the first frequency range to generate a high-frequency modified signal; and
- transmitting, with a radio frequency (RF) transmitter, the high-frequency modified signal in the first frequency range to the remote device, wherein the high-frequency modified signal is indicative of the emergency condition.

15. The method of claim 14, wherein the remote device comprises a remote autonomous vehicle.

16. The method of claim 14, wherein the received high-frequency radio signal comprises a radar signal.

17. The method of claim 14, wherein the modification to the signal phase information is based on one or more pre-selected phase parameters.

18. The method of claim 14, further comprising causing the one or more processors to amplify the modified signal in the first frequency range.

19. The method of claim 18, further comprising amplifying the modified signal in the first frequency range.

* * * * *